(12) United States Patent
Yuan et al.

(10) Patent No.: US 10,434,899 B2
(45) Date of Patent: Oct. 8, 2019

(54) MAGNETIC FIELD COMMUNICATION GROUND POWER SYSTEM OF AN ELECTRIC VEHICLE

(71) Applicant: SHENZHEN HOME HEALTH TECHNOLOGY CO., LTD, Shenzhen (CN)

(72) Inventors: Zhimin Yuan, Shenzhen (CN); Zhongwen Li, Shenzhen (CN)

(73) Assignee: SHENZHEN HOME HEALTH TECHNOLOGY CO., LTD, Shenzhen (CN)

( * ) Notice: Subject to any disclaimer, the term of this patent is extended or adjusted under 35 U.S.C. 154(b) by 255 days.

(21) Appl. No.: 15/490,902

(22) Filed: Apr. 19, 2017

(65) Prior Publication Data

US 2018/0056813 A1     Mar. 1, 2018

(30) Foreign Application Priority Data

Aug. 31, 2016 (CN) .......................... 2016 1 0793956

(51) Int. Cl.
| | |
|---|---|
| *B60M 1/10* | (2006.01) |
| *B60L 5/39* | (2006.01) |
| *B60M 7/00* | (2006.01) |
| *B60L 5/00* | (2006.01) |
| *B60L 53/12* | (2019.01) |

(52) U.S. Cl.
CPC ............. *B60M 1/103* (2013.01); *B60L 5/005* (2013.01); *B60L 5/39* (2013.01); *B60L 53/12* (2019.02); *B60M 7/00* (2013.01); *B60L 2200/26* (2013.01); *Y02T 10/7005* (2013.01); *Y02T 10/7072* (2013.01); *Y02T 90/122* (2013.01); *Y02T 90/14* (2013.01); *Y02T 90/16* (2013.01)

(58) Field of Classification Search
CPC ............. B60M 1/00; B60M 1/02; B60M 1/10
See application file for complete search history.

(56) References Cited

U.S. PATENT DOCUMENTS

2008/0011184 A1* 1/2008 Lopatinsky ............ A63H 19/24
                                                                    104/282

* cited by examiner

*Primary Examiner* — Robert J McCarry, Jr.

(57) ABSTRACT

The present disclosure provides a magnetic field communication ground power system of an electric vehicle, the system includes a reflux rail and multi-segment conductive rail mounted on a ground. The electric vehicle runs through the reflux rail, and receives electric power from the conductive rail through conductive boots so as to drive the electric vehicle to move. The system further includes: a plurality of driving positive electrodes configured to connected to the conductive rail; at least one electromagnetic controlling system configured to turn on or turn off the driving positive electrodes; a plurality of magnetic controlling systems configured to collect a position of the electric vehicle on the reflux rail, wherein the magnetic controlling systems transmit the sampled position of the electric vehicle to the electromagnetic controlling system, and the electromagnetic controlling system turns on or turns off voltage of the driving positive electrodes.

10 Claims, 3 Drawing Sheets

MAGNETIC FIELD COMMUNICATION GROUND POWER SYSTEM OF AN ELECTRIC VEHICLE

BACKGROUND

1. Technical Field

The present disclosure relates to rail traffic, and particularly to a magnetic field communication ground power system of an electric vehicle having rails.

2. Description of Related Art

A ground rail traffic system related to a previous rail traffic system may not mount electric power lines. Therefore, cost of the ground rail traffic system may be decreased, and influence of geographical environment may also be decreased. Currently, a ground rail traffic system is provided to give a load voltage to a contact of an electrode mounted on a flexible electric belt, and the load voltage is a great direct current voltage. The electrode of flexible electric belt is connected to a conductive rail through permanent magnet attracts. When an electric vehicle run through one segment of a rail, electromagnets mounted on a bottom of the electric vehicle attract flexible electrodes mounted under the rail, and the flexible electrodes connect with the conductive rail. Since the flexible electrodes are attracted by the electromagnets, high quality of materials of the flexible electrodes is required, and cost of the flexible electrodes may not be cheap.

Some companies improve magnetic field communication ground power system. An identification card is mounted on a vehicle, and card readers are respectively mounted under each segments of the conductive rail. Whether the vehicle is arrived or not may be determined by reading identification information, and high driving voltage may be turned on or turned off by controlling corresponding relay. However, which segment of the conductive rail needs to provide electric power may be determined by identifying an identifier of a hardware device. Therefore, high cost of the hardware device is required, and the hardware device may include more chips.

SUMMARY

The disclosure relates a magnetic field communication ground power system of an electric vehicle.

In one aspect, the magnetic field communication ground power system of an electric vehicle includes a reflux rail and multi-segment conductive rail mounted on a ground.

The electric vehicle runs through the reflux rail, and receives electric power from the conductive rail through conductive boots so as to drive the electric vehicle to move.

The system further includes: a plurality of driving positive electrodes configured to connected to the conductive rail; at least one electromagnetic controlling system configured to turn on or turn off the driving positive electrodes; a plurality of magnetic controlling systems configured to sample a position of the electric vehicle on the reflux rail, wherein the magnetic controlling systems transmit the sampled position of the electric vehicle to the electromagnetic controlling system, and the electromagnetic controlling system turns on or turns off voltage of the driving positive electrodes.

Further, each of the magnetic controlling systems includes a magnetic field generation device configured to be mounted on the electric vehicle and a plurality of magnetic field sensing devices configured to be respectively mounted under each of the segments of the conductive rail.

The magnetic field sensing device communicates with the electromagnetic controlling system through modulated magnetic field signals. The magnetic field producing device generates the magnetic field signals modulated by identifiers and transmits the modulated magnetic field signals.

The magnetic field sensing devices receive and analyze the magnetic field signals to transform the magnetic field signals into controlling signals. The magnetic field sensing devices further transmit the controlling signals to the electromagnetic controlling system to control the voltage of the driving positive electrodes. Further, the reflux rail is connected to a ground terminal when the reflux rail is not powered on.

Further, the system includes a plurality of the electromagnetic controlling systems. Each of the electromagnetic controlling systems respectively communicates with the magnetic controlling systems through a bus.

The magnetic controlling systems respectively transmit the controlling signals having the different identifiers according to the magnetic pulse signals. The electromagnetic controlling systems determine the position of the magnetic field sensing device transmitting the controlling signals according to the identifier. The electric power is provided to the segment of the conductive rail corresponding to the position.

Further, the magnetic field producing device includes a magnetic field generation circuit and a modulation circuit. The magnetic field generation circuit configured to generate the electromagnetic signals. The modulation circuit configured to modulate the electromagnetic signals. The magnetic field sensing devices obtains the identifiers and the controlling signals when the magnetic field sensing devices receive and analyze the electromagnetic signals.

Further, the modulation circuit applies a binary pulse modulation to a strength of the electromagnetic signals generated by the magnetic field generation circuit according to a predetermined threshold of the electromagnetic signals strength.

Further, the magnetic field sensing devices includes a magnetic field receiving circuit and a demodulation circuit. The magnetic field receiving circuit configured to receive the electromagnetic signals generated by the magnetic field generation device. The demodulation circuit configured to demodulate the received electromagnetic signals.

Further, the electromagnetic controlling system includes a controlling circuit. The controlling circuit is configured to connect to the driving positive electrodes through a bus, to receive an identifier transmitted by the magnetic controlling systems and controlling signals, and to load high voltage driving signals to the driving positive electrodes corresponding to the identifier. Further, an operation voltage of the driving positive electrodes is 750 V The segments of the conductive rail of the present disclosure are respectively connected to one of the driving positive electrodes. The conductive boots receive driving voltage of the driving positive electrodes through the conductive rail. When the electromagnetic controlling system receives the controlling signals of the magnetic controlling systems and the identifiers, the electric power is provide to the corresponding segment of the conductive rail according to the identifiers.

In view of the above, the electric power provided to determine the position of the electric vehicle, to identify signals by the magnetic controlling systems, and to analyze the identifiers is transmitted by electromagnetic field. The identifiers are modulated in the electromagnetic signals. When the electromagnetic signals are received, the position of the electric vehicle may be determined. Therefore, the identifiers may not be transmitted by hardware, and cost of the hardware may not be increased. Power consumption for transmitting controlling signals and the identifiers through the magnetic field signals is less than power consumption for transmitting controlling signals and the identifiers through the hardware.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
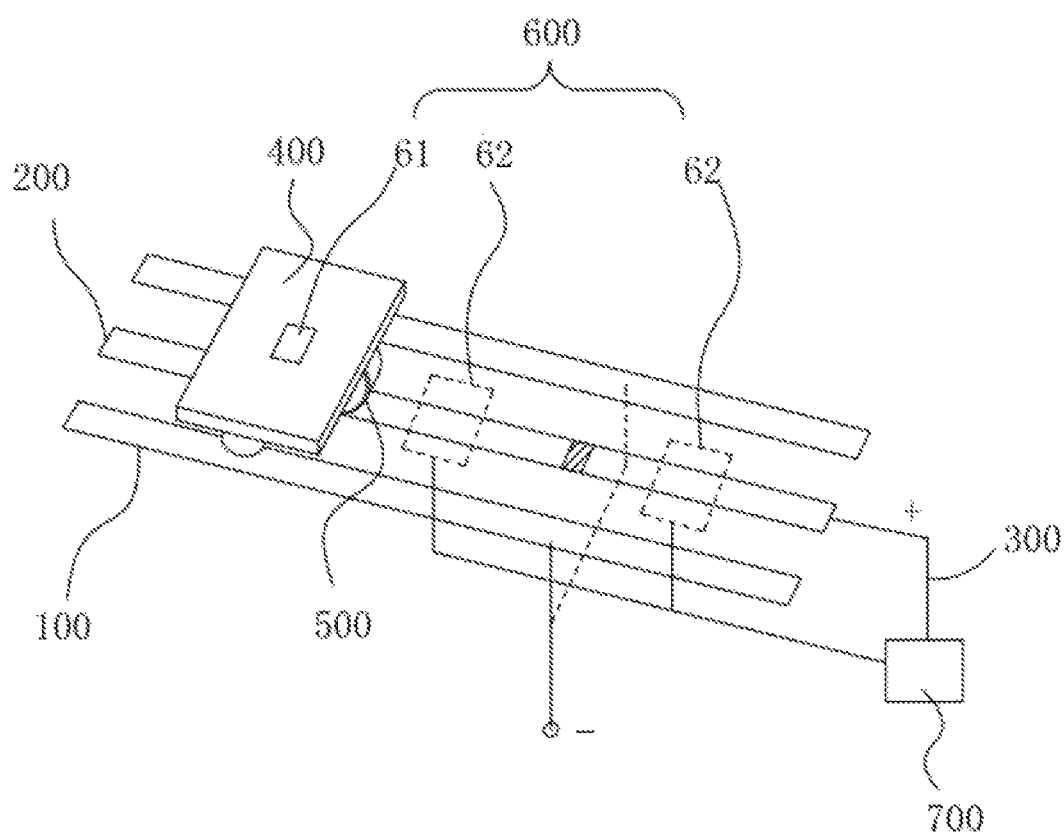
FIGS. 1 and 2 are schematic views of a magnetic field communication ground power system of an electric vehicle in accordance with one embodiment of the present disclosure.

The disclosure is illustrated by way of example and not by way of limitation in the figures of the accompanying drawings, in which like reference numerals indicate similar elements.

Figure 2:
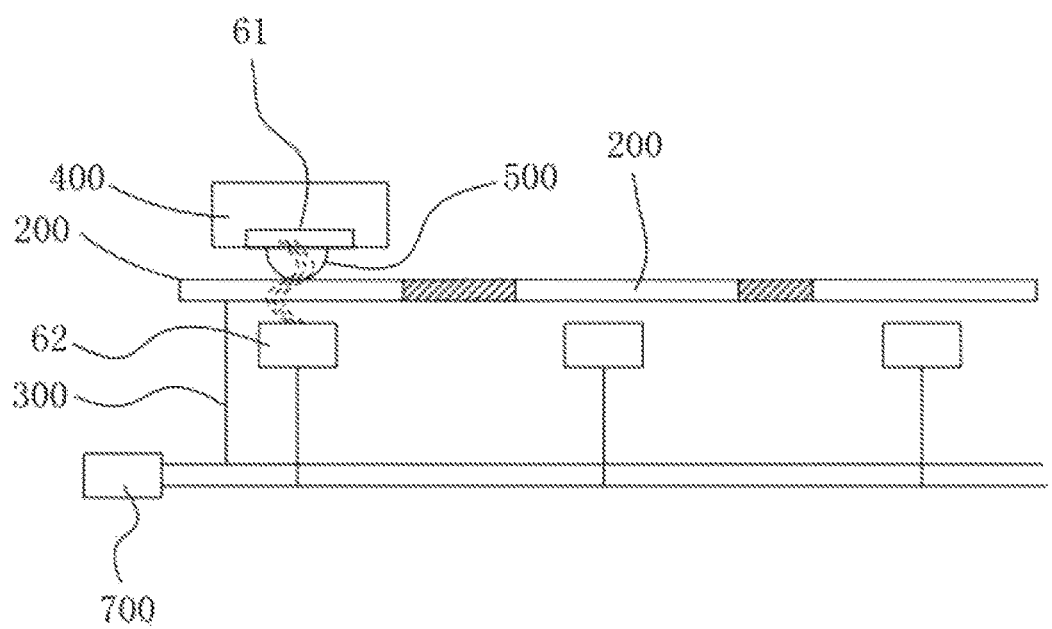

With reference to FIGS. 1 and 2, the present disclosure relates to a magnetic field communication ground power system of an electric vehicle, the system includes a reflux rail 100 and a conductive rail 200. The conductive rail 200 is connected to a plurality of driving positive electrodes 300. The electric vehicle 400 is configured with conductive boots 500 connecting with the conductive rail 200, and the electric vehicle receives electric power from the conductive rail 200. When the conductive rail 200 is loaded with a driving voltage, the conductive rail 200, the conductive boots 500, the electric vehicle driving system, and the reflux rail 100 cooperatively form a current loop. When the conductive rail 200 is not loaded with the driving voltage, the conductive rail 200 and the reflux rail 100 are connected, and both of the conductive rail 200 and the reflux rail 100 are grounded to increase the safety.

The electric vehicle 400 runs through the reflux rail 100, and the conductive rail 200 includes multi-segments. The segments of the conductive rail 200 are connected in parallel, and are separately mounted on the ground.

In the embodiment, the magnetic field communication ground power system further includes an electromagnetic controlling system 700 configured to control a voltage of the driving positive electrode 300. The electromagnetic controlling system 700 may turn on or turn off the voltage of the driving positive electrodes 300. The magnetic field communication ground power system further includes a plurality of magnetic controlling systems 600 configured to collect a position of the electric vehicle 400 and to transmit the position and controlling signals to the electromagnetic controlling system 700.

The magnetic controlling systems 600 are mounted around the conductive rail 200. Each of the magnetic controlling systems 600 corresponds to one of the segments of the conductive rail 200.

The magnetic controlling systems 600 communicate with one electromagnetic controlling system 700 through a bus.

Each of the electromagnetic controlling systems 700 receives the position of the electric vehicle 400 and the controlling signals transmitted by the magnetic controlling systems 600.

The electromagnetic controlling system 700 control the driving positive electrodes 300 connected to the corresponding segment of the conductive rail 200 to load the driving voltage according to the position of the electric vehicle 400 and the controlling signals. Thus, the electric power may be adaptively provided.

In the present embodiment, the current position of the electric vehicle 400 is determined by analyzing the electromagnetic signals generated by the magnetic controlling systems 600. In other words, by determining which segment of the conductive rail 200 through which the electric vehicle 400 runs, the magnetic controlling systems 600 transmit the controlling signals and the position to the electromagnetic controlling system 700. The electromagnetic controlling system 700 controls the corresponding segment of the conductive rail 200 to load the driving voltage so as to drive the electric vehicle 400 to move. Compared with a traditional way to determine the position of the electric vehicle 400 on the conductive rail 200 through hardware chip, the present disclosure may determine the position of the electric vehicle 400 without the hardware chip, and thus the cost may be decreased. In addition, the position of the electric vehicle 400 is determined by the electromagnetic signals, the power consumption of the hardware may be decreased.

Figure 3:
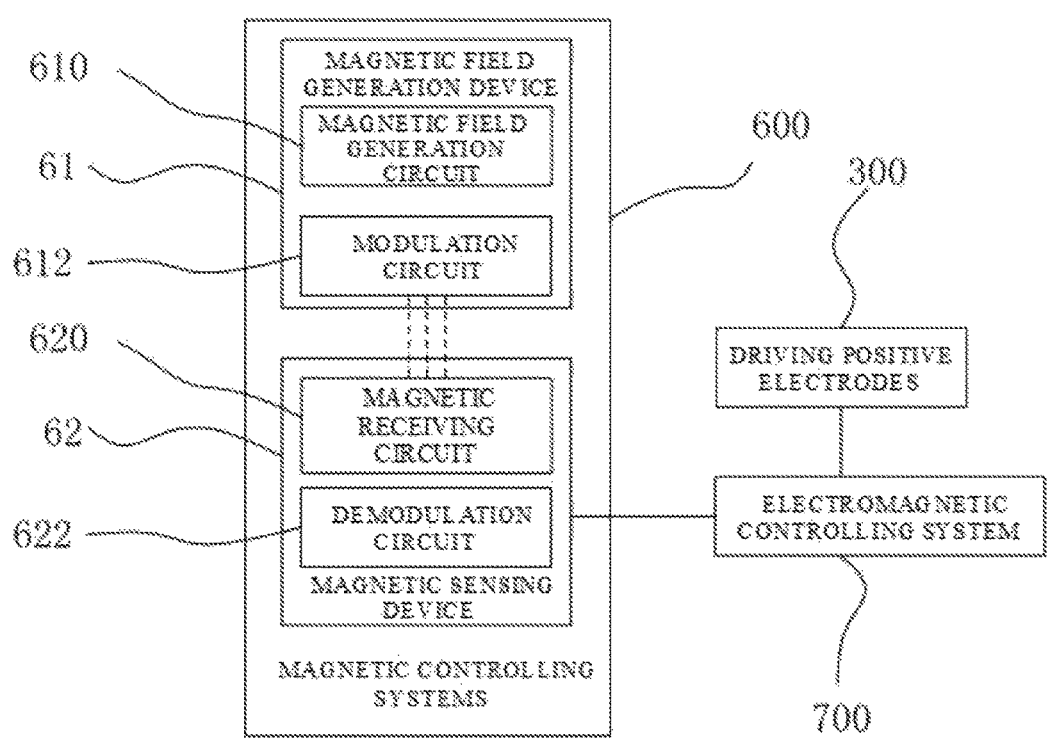
FIG. 3 is a block diagram of the magnetic field communication ground power system of an electric vehicle of FIG. 1.

With reference to FIG. 3, further, the magnetic controlling systems 600 includes a magnetic field generation device 61 configured to be mounted on the electric vehicle 400, and a plurality of magnetic sensing devices 62 configured to be respectively mounted under each segments of the conductive rail 200.

The magnetic sensing device 62 is communicated with the electromagnetic controlling system 700. The magnetic field generation device 61 generates transformed magnetic field signals. The magnetic sensing device 62 receives the transformed magnetic field signals, and analyzes the received transformed magnetic field signals so as to determine one of the segment of the conductive rail 200 corresponding to the current magnetic sensing device 62. At the same time, the magnetic sensing device 62 further transmits controlling signals to the electromagnetic controlling system 700. The electromagnetic controlling system 700 controls the driving positive electrode 300 connected to the corresponding segment of the conductive rail 200 to load the driving voltage according to the position of the corresponding segment of the conductive rail 200. As such, the electric power is provided to the electric vehicle 400.

Further, the magnetic field generation device 61 includes a magnetic field generation circuit 610 and a modulation circuit 612. The magnetic field generation circuit 610 is configured to generate the electromagnetic signals. The modulation circuit 612 is configured to modulate the electromagnetic signals. As such, when the magnetic sensing device 62 receives and analyzes the electromagnetic signals, the identifiers and the controlling signals may be determined. The modulation circuit 612 applies a binary pulse modulation to a strength of the electromagnetic signals generated by the magnetic field generation circuit 610 according to a predetermined threshold of the electromagnetic signals strength.

With reference to FIG. 3, the magnetic sensing device 62 includes a magnetic field receiving circuit 620 and a demodulation circuit 622. The magnetic field receiving circuit 620 is configured to receive the electromagnetic signals generated by the magnetic field generation device 61. The demodulation circuit 622 is configured to demodulate the received electromagnetic signals. The electromagnetic controlling system 700 includes a controlling circuit. The controlling circuit connects to the magnetic controlling systems 600 and the driving positive electrodes 300 through a bus, receives an identifier transmitted by the magnetic controlling systems 600 and controlling signals, and loads high-voltage driving signals to the driving positive electrodes 300 corresponding to the segment of the conductive rail 200.

In the embodiment, there are multiple electromagnetic controlling systems 700, and each of the electromagnetic controlling systems 700 communicate with the multiple magnetic controlling systems 600 through the bus.

The magnetic controlling systems 600 respectively transmit the controlling signals having the different identifiers according to the electromagnetic signals. The electromagnetic controlling systems 700 determine the position of the magnetic field sensing device 600 transmitting the controlling signals according to the identifier. Then, the electric power is provided to the corresponding segment of the conductive rail 200.

In the embodiment, the magnetic field is modulated by configuring a predetermined threshold of the strength of the magnetic field. The magnetic field generation device 61 generates magnetic fields having different identifiers according to difference of the position of the electric vehicle 400. The magnetic sensing device 62 receives the transformed magnetic fields, and analyzes the magnetic fields to determine the identifiers. The magnetic sensing device 62 further transmits the identifiers and the controlling signals to the electromagnetic controlling system 700.

The electromagnetic controlling system 700 controls the electric power to be provided to the driving positive electrodes 300 of the corresponding position, wherein other particular hardware, identify chips, and modules may be excluded. Thus, only magnetic coils and a modulation module to modulate the voltages of the magnetic coils are needed, which greatly reduce the cost.

In the embodiment, to enhance the safety, the reflux rail 100 is connected to a ground terminal when the conductive rail 200 is not powered on.

In the embodiment, an operation voltage of the driving positive electrodes 300 is 750 V.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A magnetic field communication ground power system of an electric vehicle, comprising:
   a reflux rail and a multi-segment conductive rail mounted on a ground; wherein the electric vehicle runs through the reflux rail, and receives electric power from the conductive rail through conductive boots connecting with the conductive rail, so as to drive the electric vehicle to move, and segments of the conductive rail are connected in parallel;
   a plurality of driving positive electrodes being connected to the conductive rail;
   at least one electromagnetic controlling system configured to turn on or turn off the driving positive electrodes;
   a plurality of magnetic controlling systems configured to sample a position of the electric vehicle on the reflux rail, wherein the magnetic controlling systems transmit the sampled position of the electric vehicle to the electromagnetic controlling system, and the electromagnetic controlling system turns on or turns off at least one voltage of the driving positive electrodes.

2. The magnetic field communication ground power system as claimed in claim 1, wherein each of the magnetic controlling systems comprises:
   a magnetic field generation device configured to be mounted on the electric vehicle and a plurality of magnetic field sensing devices configured to be respectively mounted under each of the conductive rail;
   wherein the magnetic field sensing device communicates with the electromagnetic controlling system through modulated magnetic field signals;
   wherein the magnetic field producing device generates the magnetic field signals modulated by identifiers and transmits the modulated magnetic field signals;
   wherein the magnetic field sensing devices receive and analyze the magnetic field signals to transform the magnetic field signals into controlling signals;
   wherein the magnetic field sensing devices further transmit the controlling signals to the electromagnetic controlling system to control the voltage of the driving positive electrodes.

3. The magnetic field communication ground power system as claimed in claim 1, wherein the reflux rail is connected to a ground terminal when the conductive rail is not powered on.

4. The magnetic field communication ground power system as claimed in claim 2, wherein the system comprises a plurality of the electromagnetic controlling systems;
   each of the electromagnetic controlling systems respectively communicate with the magnetic controlling systems through a bus;
   the magnetic controlling systems respectively transmit the controlling signals having the different identifiers according to the electromagnetic signals;
   the electromagnetic controlling systems determine the position of the magnetic field sensing device transmitting the controlling signals according to the identifier;
   the electric power is provided to the corresponding segment of the conductive rail.

5. The magnetic field communication ground power system as claimed in claim 2, wherein the magnetic field producing device comprises:
   a magnetic field generation circuit configured to generate the electromagnetic signals;
   a modulation circuit configured to modulate the electromagnetic signals;
   the magnetic field sensing device obtains the identifiers and the controlling signals when the magnetic field sensing devices receive and analyze the electromagnetic signals.

6. The magnetic field communication ground power system as claimed in claim 5, wherein the modulation circuit applies a binary pulse modulation to a strength of the electromagnetic signals generated by the magnetic field generation circuit according to a predetermined threshold of the strength of the electromagnetic signals.

7. The magnetic field communication ground power system as claimed in claim 2, wherein the magnetic field sensing devices comprises:
   a magnetic field receiving circuit configured to receive the electromagnetic signals generated by the magnetic field generation device;
   a demodulation circuit configured to demodulate the received electromagnetic signals.

8. The magnetic field communication ground power system as claimed in claim 1, wherein the electromagnetic controlling system comprises:
   a controlling circuit configured to connect to the driving positive electrodes through a bus, to receive an identifier and controlling signals transmitted by the magnetic controlling systems, and to load high voltage driving signals to the driving positive electrodes corresponding to the corresponding segment of the conductive rail.

9. The magnetic field communication ground power system as claimed in claim 1, wherein an operation voltage of the driving positive electrodes is 750 V.

10. The magnetic field communication ground power system as claimed in claim 3, wherein when the conductive rail is not loaded with driving voltage, the conductive rail and the reflux rail are connected, and both of the conductive rail and the reflux rail are grounded.

* * * * *